United States Patent
Yan et al.

(10) Patent No.: US 7,961,801 B2
(45) Date of Patent: Jun. 14, 2011

(54) TRANSMITTER IDENTIFICATION INFORMATION SIGNAL DETECTION APPARATUS AND METHOD

(75) Inventors: Liang Yan, Taipei Hsien (TW); Guangling Zhao, Taipei Hsien (TW)

(73) Assignee: VIA Technologies, Inc., New Taipei (TW)

( * ) Notice: Subject to any disclaimer, the term of this patent is extended or adjusted under 35 U.S.C. 154(b) by 613 days.

(21) Appl. No.: 12/099,540

(22) Filed: Apr. 8, 2008

(65) Prior Publication Data

US 2009/0207949 A1    Aug. 20, 2009

(30) Foreign Application Priority Data

Feb. 20, 2008   (CN) .......................... 2008 1 0081258

(51) Int. Cl.
*H04K 1/10*   (2006.01)
*H04L 27/28*  (2006.01)

(52) U.S. Cl. ......... 375/260; 375/343; 375/340; 375/316

(58) Field of Classification Search ................... 375/343, 375/340, 260, 316
See application file for complete search history.

(56) References Cited

U.S. PATENT DOCUMENTS

| 6,134,267 | A  | * | 10/2000 | Schafer et al. ................. 375/224 |
| 7,359,312 | B2 | * | 4/2008  | Riazi et al. ..................... 370/208 |
| 7,831,885 | B2 | * | 11/2010 | Choi et al. ..................... 714/755 |
| 2005/0111522 | A1 | * | 5/2005 | Sung et al. ..................... 375/145 |
| 2006/0268673 | A1 | * | 11/2006 | Roh et al. ....................... 370/203 |
| 2009/0067515 | A1 | * | 3/2009 | Galperin et al. ............... 375/260 |
| 2009/0175379 | A1 | * | 7/2009 | Rubin et al. .................... 375/295 |

* cited by examiner

*Primary Examiner* — Phuong Phu
(74) *Attorney, Agent, or Firm* — J.C. Patents (57) ABSTRACT

A transmitter identification information (TII) signal detection circuit is suitable for an orthogonal frequency division modulation system. A TII signal detection circuit receives a TII signal and conducts a cross-correlation calculation on the TII signal and a phase reference symbol (PRS) so as to obtain a present cross-correlation result, and then, sums the cross-correlation results obtained by conducting cross-correlations on AVE_TF_NUM-1 pieces of TII signals and the PRS and the present cross-correlation result so as to obtain an accumulated cross-correlation result. After that, a plurality of indices corresponding to a plurality of maximal values in the accumulated cross-correlation result is found out according to the accumulated cross-correlation result. Finally, a present main identifier (MainId) and a present sub-identifier (SubId) are calculated according to the four indices corresponding to the four maximal values, wherein the cross-correlation calculation is conducted on the TII signal and the PRS of every two adjacent sub-carriers.

15 Claims, 9 Drawing Sheets

| p | $\alpha_b(p)$ b=0,1,2,3,4,5,6,7 |
|---|---|
| 0 | 00001111 |
| 1 | 00010111 |
| 2 | 00011011 |
| 3 | 00011101 |
| 4 | 00011110 |
| 5 | 00100111 |
| 6 | 00101011 |
| 7 | 00101101 |
| 8 | 00101110 |
| 9 | 00110011 |
| 10 | 00110101 |
| 11 | 00110110 |
| 12 | 00111001 |
| 13 | 00111010 |
| 14 | 00111100 |
| 15 | 01000111 |
| 16 | 01001011 |
| 17 | 01001101 |
| 18 | 01001110 |
| 19 | 01010011 |
| 20 | 01010101 |
| 21 | 01010110 |
| 22 | 01011001 |
| 23 | 01011010 |

| p | $\alpha_b(p)$ b=0,1,2,3,4,5,6,7 |
|---|---|
| 24 | 01011100 |
| 25 | 01100011 |
| 26 | 01100101 |
| 27 | 01100110 |
| 28 | 01101001 |
| 29 | 01101010 |
| 30 | 01101100 |
| 31 | 01110001 |
| 32 | 01110010 |
| 33 | 01110100 |
| 34 | 01111000 |
| 35 | 10000111 |
| 36 | 10001011 |
| 37 | 10001101 |
| 38 | 10001110 |
| 39 | 10010011 |
| 40 | 10010101 |
| 41 | 10010110 |
| 42 | 10011001 |
| 43 | 10011010 |
| 44 | 10011100 |
| 45 | 10100011 |
| 46 | 10100101 |
| 47 | 10100110 |

| p | $\alpha_b(p)$ b=0,1,2,3,4,5,6,7 |
|---|---|
| 48 | 10101001 |
| 49 | 10101010 |
| 50 | 10101100 |
| 51 | 10110001 |
| 52 | 10110010 |
| 53 | 10110100 |
| 54 | 10111000 |
| 55 | 11000011 |
| 56 | 11000101 |
| 57 | 11000110 |
| 58 | 11001001 |
| 59 | 11001010 |
| 60 | 11001100 |
| 61 | 11010001 |
| 62 | 11010010 |
| 63 | 11010100 |
| 64 | 11011000 |
| 65 | 11100001 |
| 66 | 11100010 |
| 67 | 11100100 |
| 68 | 11101000 |
| 69 | 11110000 |

TRANSMITTER IDENTIFICATION INFORMATION SIGNAL DETECTION APPARATUS AND METHOD

CROSS-REFERENCE TO RELATED APPLICATION

This application claims the priority benefit of China application serial no. 200810081258.3, filed on Feb. 20, 2008. The entirety of the above-mentioned patent application is hereby incorporated by reference herein and made a part of this specification.

BACKGROUND OF THE INVENTION

1. Field of the Invention

The present invention generally relates to a digital transmitter identification information signal (TII signal) detection circuit and the method thereof, and more particularly, to a circuit and a method for detecting TII signal in a digital audio broadcast (DAB) system.

2. Description of Related Art

A DAB system is a broadcast system with high transmission quality, where the system adopts OFDM (Orthogonal Frequency Division Modulation) scheme so as to possess good robustness against channel decay and noise.

In the DAB standard, a TII signal is carried by an OFDM symbol, and the TII signal is defined at a position of a null symbol. The TII signal provides the transmitter identification information, so that a receiver is able to recognize where the data sent by a transmitter comes from and the zone to which the transmitter belongs. A TII is mainly categorized into main identifier (MainId) and sub-identifier (SubId). In the DAB system, the TII signal is presented once every two adjacent OFDM frames and takes a position of null symbol.

The MainId has seven bits with a coding range of 0-69, while the SubId has five bits with a coding range of 1-23. In the DAB standard, the definitions of the MainId and SubId are specified, and a TII signal is corresponding to the coding values of a MainId and a SubId, namely, the matching relations of MainId-SubId-TII signal are specified in the DAB standard.

According to the DAB standard, a TII signal in an OFDM symbol is conveyed by a couple of pairs of adjacent sub-carrier signals. As mentioned above, a TII signal can be looked up by the coding values of the corresponding pair of MainId and SubId. In other words, once a receiver decodes an implicated TII signal, the coding values of MainId and SubId with the transmitter to locate are accordingly solved.

Assuming the coding values of MainId and SubId are respectively coding p and c, the TII signal $S_{TII}(t)$ can be expressed according to the DAB standard by the following equation:

$$S_{TII}(t) = \text{Re}\left\{ \exp(j2\pi f_c t) \sum_{m=-\infty}^{\infty} \sum_{k=-K/2}^{K/2} Z_{m,0,k} g_{TH,k}(t - mT_F) \right\}$$

$$g_{TH,k}(t) = \exp(j2\pi k(t - T_{NULL} + T_U)/T_U)\text{Re } ct(t/T_{NULL})$$

wherein $T_U$ represents the reciprocal of the frequency difference of two adjacent sub-carriers, $T_{NULL}$ represents the signal duration of a null symbol, $f_c$ represents the center frequency of the DAB signal, $Z_{m,0,k}$ represents the complex number value carried by the k-th sub-carrier in the null symbol, Re{●} represents an operator for extracting real number value, exp(●) represents exponent function and Rect(●) represents square wave function. When a TII signal is not transmitted, $Z_{m,0,k}$ is equal to zero; when the TII signal is transmitted, $Z_{m,0,k}$ is decided by the coding value p of MainId and the coding value c of SubId.

According to the DAB standard, $Z_{m,0,k}$ is expressed by the following equation:

$$Z_{m,0,k} = A_{c,p}(k)\exp(j\phi_k) + A_{c,p}(k-1)\exp(j\phi_{k-1})$$

wherein $\phi_k$ and $\phi_{k-1}$ represent phase reference symbol (PRS) defined in the DAB standard, and $A_{c,p}(k)$ represents amplitude which are respectively defined by different equations in the four transmission modes I, II, III and IV of the DAB standard. For the transmission modes II, $A_{c,p}(k)$ is defined as follows:

$$A_{c,p}(k) = \sum_{b=0}^{3} \delta(k, -192 + 2c + 48b)a_b(p) + \sum_{b=4}^{7} \delta(k, -191 + 2c + 48b)a_b(p)$$

and $$A_{c,p}(k) = 0 \text{ if } k < -192 \text{ or } k > 192 \text{ or } k = 0$$

$$\delta(i, j) = \begin{cases} 1 & \text{if } i = j \\ 0 & \text{if } i \neq j \end{cases}$$

wherein $a_b(p)$ is calculation factor defined in the lookup table of FIG. 1.

Figure 2:
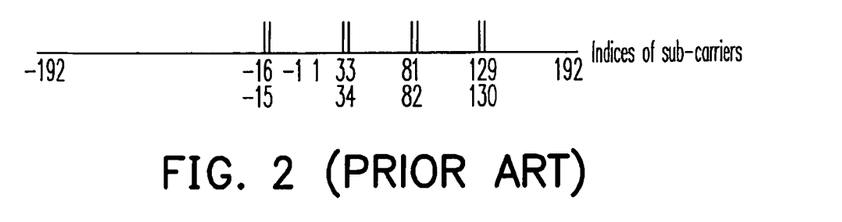
FIG. 2 is a signal wave diagram of a TII signal of transmission mode II.

FIG. 1 is a lookup table (LUT) showing the relationship between the coding value p of MainId and the calculation factor $a_b(P)$ of TII signal according to the DAB standard, and FIG. 2 is a signal wave diagram of a TII signal of transmission mode II. Referring to FIGS. 2 and 1, the TII signal thereof is corresponding to a coding value c=16 of SubId and a coding value p=4 of MainId, and it can be found according to the LUT of FIG. 1 that $a_b(P)$=00011110. Then, $A_{c,p}(k)$ and $A_{c,p}(k-1)$ can be calculated respectively by:

$$A_{c,p}(k) = \delta(k,-16) + \delta(k,33) + \delta(k,81) + \delta(k,129)$$

$$A_{c,p}(k-1) = \delta(k-1,-16) + \delta(k-1,33) + \delta(k-1,81) + \delta(k-1,129)$$

It can be seen from the above-mentioned calculation results that $Z_{m,0,k}$ is not equal to zero only when k=−16, −15, 33, 34, 81, 82 and 129, which means the TII signal is not equal to zero only corresponding to the sub-carrier of the TII signal, wherein the indices of the sub-carriers take −16, −15, 33, 34, 81, 82 and 129. Besides, as described above, the TII signal obtained by calculation has a characteristic that every two adjacent sub-carriers with signal values (non-zero) form a pair. In other words, the TII signal has a couple of pairs of two adjacent sub-carrier signals.

F. Van de Laar, N. Philips and J. Huisken have pointed out in their paper "*Towards the Next Generation of DAB Receivers*, EBU Technical Review, Summer 1997" that every pair of sub-carrier signals in a TII signal is the same as the sub-carrier signals of the reference symbol, so that the TII signal can be obtained by conducting a checking operation on the sub-carrier signals of null symbols. In addition, three TII signals can be solved every time according to several OFDM frames.

However, the above-mentioned scheme needs to check the sub-carrier signals of every null symbol to obtain TII signals, which accordingly needs a register with large capacity to register the values of every sub-carrier signal. Furthermore, the procedure to check every sub-carrier of the null symbols consumes a great amount of time. In short, the conventional TII signal detection method takes too long time and needs a register with large capacity to register sub-carrier signals, therefore, the prior art does not meet the requirement of real-time network.

SUMMARY OF THE INVENTION

Accordingly, the present invention is directed to a transmitter identification information signal (TII signal) detection circuit, an orthogonal frequency division modulation system (OFDM system) receiver capable of detecting a TII signal and a TII signal detection method. Compared to the conventional detection circuit, receiver and detection method, the present invention is advantageous in simplicity of implementation, less calculation time and high robustness against noise and interference.

The present invention provides a TII signal detection circuit of OFDM system to receive a TII signal. The TII signal detection circuit includes a correlator, an accumulator, a selector and a calculation unit. The correlator is used to conduct a cross-correlation calculation on the TII signal and a phase reference symbol (PRS) for obtaining a present cross-correlation result. The accumulator is employed for summing a plurality of cross-correlation results to obtain an accumulated cross-correlation result, wherein m is the quantity of the TII signals required for obtaining the accumulated cross-correlation result. The selector is employed for finding out a plurality of indices corresponding to a plurality of maximal values in the accumulated cross-correlation result. The calculation unit is employed for calculating a present MainId and a present SubId of the TII signal according to the indices.

The present invention provides an OFDM receiver capable of detecting a TII signal. The receiver includes an OFDM modulator; a decoder, a TII signal detection circuit. The decoder is coupled to the OFDM modulator, and the TII signal detection circuit coupled to the OFDM modulator, wherein the TII signal detection circuit receives a TII signal. The TII signal detection circuit includes a correlator, an accumulator, a selector and a calculation unit. The correlator is used to conduct a cross-correlation calculation on the TII signal and a PRS for obtaining a present cross-correlation result, and the accumulator used to sum a plurality of cross-correlation results to obtain an accumulated cross-correlation result, wherein m is the quantity of the TII signals required for obtaining the accumulated cross-correlation result. The selector is employed for finding out a plurality of indices corresponding to a plurality of maximal values in the cross-correlation result according to the accumulated cross-correlation result, and the calculation unit is employed for calculating a present MainId and a present SubId of the TII signal according to the indices.

The present invention provides a TII signal detection method suitable for an OFDM system. The method includes: (a) receiving a TII signal and conducting a cross-correlation calculation on the TII signal and a PRS to obtain a present cross-correlation result, wherein the cross-correlation calculation is conducted once on the TII signal and a PRS for every two sub-carriers; (b) summing the present cross-correlation result and the last (m−1) pieces of the previous cross-correlation results of the TII signal and the PRS so as to obtain an accumulated cross-correlation result, wherein m is the quantity of the TII signals required for obtaining the accumulated cross-correlation result; (c) finding out a plurality of indices corresponding to a plurality of indices in the accumulated cross-correlation result; (d) calculating out a present MainId and a present SubId of the TII signal according to the indices.

In summary, the TII signal detection circuit, the method and the receiver provided by the present invention function to conduct cross-correlation calculation once for every two adjacent sub-carrier signals and groups division, thus, the memory or the register required for the function can be reduced. Moreover, thanks to the mechanism of correcting MainId and SubId, the probability of correctly decoding the TII signal is close to 100%. Compared to the conventional circuit and method, the advantage of the present invention rests in simplicity of implementation, less calculation time and high robustness against noise and interference.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a lookup table showing the relationship between the coding value p of MainId and the calculation factor $a_b(p)$ of the TII signal according to the DAB standard.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The embodiment of the present invention provides a circuit and a method for detecting TII in an OFDM system. Compared to the prior art, the present invention is advantageous in simplicity of implementation, less calculation time and high robustness against noise and interference.

The present invention is exemplary for a DAB system application, but the disclosed embodiment of the present invention is not limited to be applied to the DAB system. In the embodiment, the major idea is to use the cross-correlation between a PRS and a TII signal defined in the DAB standard to detect the TII signal, and thereby to solve the coding value p of MainId and the coding value c of SubId. Since the TII signal has characteristic that every two adjacent sub-carriers with signal values (non-zero) form a pair, therefore, only an operation of cross-correlation on every two sub-carriers needs to be conducted, wherein the cross-correlation is calculated by the following equation:

$$Xcorr(n) = \sum_{m=1}^{2} TII(2*(n-1)+m) \cdot PRS(2*(n-1)+m)^*$$

$$n = 1, \ldots, Grouplen$$

wherein TII(k) is the k-th sub-carrier signal of the re-numbered TII signal. Particularly for transmission mode II, the (−192)-th sub-carrier signal of the TII signal would be re-numbered into the first sub-carrier signal, the (−191)-th sub-carrier signal of the TII signal would be re-numbered into the second sub-carrier signal and the (−190)-th, (−189)-th until (−1)-th sub-carrier signals are analogically processed. Meanwhile, the 0-th sub-carrier signal of the TII signal (i.e., the DC signal) remains as the 0-th sub-carrier signal. Moreover, the first sub-carrier signal of the TII signal would be re-numbered into the 193-th sub-carrier signal, the second sub-carrier signal of the TII signal would be re-numbered into the 194-th sub-carrier signal and the third, fourth until 192-th sub-carrier signals are analogically processed. PRS(k)* is the conjugator of the re-numbered PRS and the renumbering method thereof is the same as TII(k). Grouplen represents group length, and is equal to 192 for transmission mode II.

For transmission mode III, the (−96)-th sub-carrier signal of the TII signal would be re-numbered into the first sub-carrier signal, the (−91)-th sub-carrier signal of the TII signal would be re-numbered into the second sub-carrier signal and the (−90)-th, (−89)-th until (−1)-th sub-carrier signals are analogically processed. Meanwhile, the 0-th sub-carrier signal of the TII signal (i.e., the DC signal) remains as the 0-th sub-carrier signal. Moreover, the first sub-carrier signal of the TII signal would be re-numbered into the 97-th sub-carrier signal, the second sub-carrier signal of the TII signal would be re-numbered into the 98-th sub-carrier signal and the third, fourth until 192-th sub-carrier signals are analogically processed. Grouplen is equal to 96 for transmission mode II.

In addition for transmission modes I and IV, since the sub-carriers in the TII signal are corresponding to one another, therefore, the initial TII signal can be divided into four groups (note that it is divided into two groups for transmission mode IV), followed by conducting a cross-correlation calculation on the TII signal and the PRS of each group. The groups division has an advantage of reducing the register space, and increasing the probability of correctly solving the MainId and the SubId if conducting a summation operation on the results of every group. For transmission mode I, $A_{c,p}(k)$ is defined by:

$$A_{c,p}(k) = \begin{cases} \sum_{b=0}^{7} \delta(k, -768 + 2c + 48b)a_b(p) & \text{for } -768 \le k \le -385 \\ \sum_{b=0}^{7} \delta(k, -384 + 2c + 48b)a_b(p) & \text{for } -384 \le k \le -1 \\ \sum_{b=0}^{7} \delta(k, 1 + 2c + 48b)a_b(p) & \text{for } 1 \le k \le 384 \\ \sum_{b=0}^{7} \delta(k, 385 + 2c + 48b)a_b(p) & \text{for } 385 \le k \le 768 \end{cases}$$

Therefore, the symmetry and periodicity of the sub-carriers of the TII signal can be revealed from the above equations, which means the signal value would be repeated after 384 sub-carriers. When the TII signal is divided into four groups, TII(k) of the first group is the k-th sub-carrier signal of the re-numbered TII signal of the first group, the (−768)-th sub-carrier signal of the TII signal of the first group is the first sub-carrier signal of the re-numbered TII signal, the (−767)-th sub-carrier signal of the TII signal of the first group is the second sub-carrier signal of the re-numbered TII signal and the rest (−766)-th until (−385)-th signals of the TII signal of the first group would be analogically processed. In the same way, TII(k) of the second group is the k-th sub-carrier signal of the re-numbered TII signal of the second group, the (−384)-th sub-carrier signal of the TII signal of the second group is the first sub-carrier signal of the re-numbered TII signal, the (−383)-th sub-carrier signal of the TII signal of the second group is the second sub-carrier signal of the re-numbered TII signal and the rest (−382)-th until (−1)-th signals of the TII signal of the second group would be analogically processed.

Similarly, TII(k) of the third group is the k-th sub-carrier signal of the re-numbered TII signal of the third group, the first sub-carrier signal of the TII signal of the third group is the first sub-carrier signal of the re-numbered TII signal, the second sub-carrier signal of the TII signal of the third group is the second sub-carrier signal of the re-numbered TII signal and the rest third until (384)-th signals of the TII signal of the third group would be analogically processed. TII(k) of the fourth group is the k-th sub-carrier signal of the re-numbered TII signal of the fourth group, the (385)-th sub-carrier signal of the TII signal of the fourth group is the first sub-carrier signal of the re-numbered TII signal, the (386)-th sub-carrier signal of the TII signal of the fourth group is the second sub-carrier signal of the re-numbered TII signal and the rest (387)-th until (768)-th signals of the TII signal of the fourth group would be analogically processed. PRS(k)* is the conjugator of the re-numbered PRS and the renumbering method thereof is the same as TII(k). Grouplen is represents group length and is equal to 192 for transmission mode I. For transmission mode IV, the TII(k) and Grouplen of the first group and second group can be easily deducted according the above described, wherein Grouplen is 192 too.

Figure 3A:
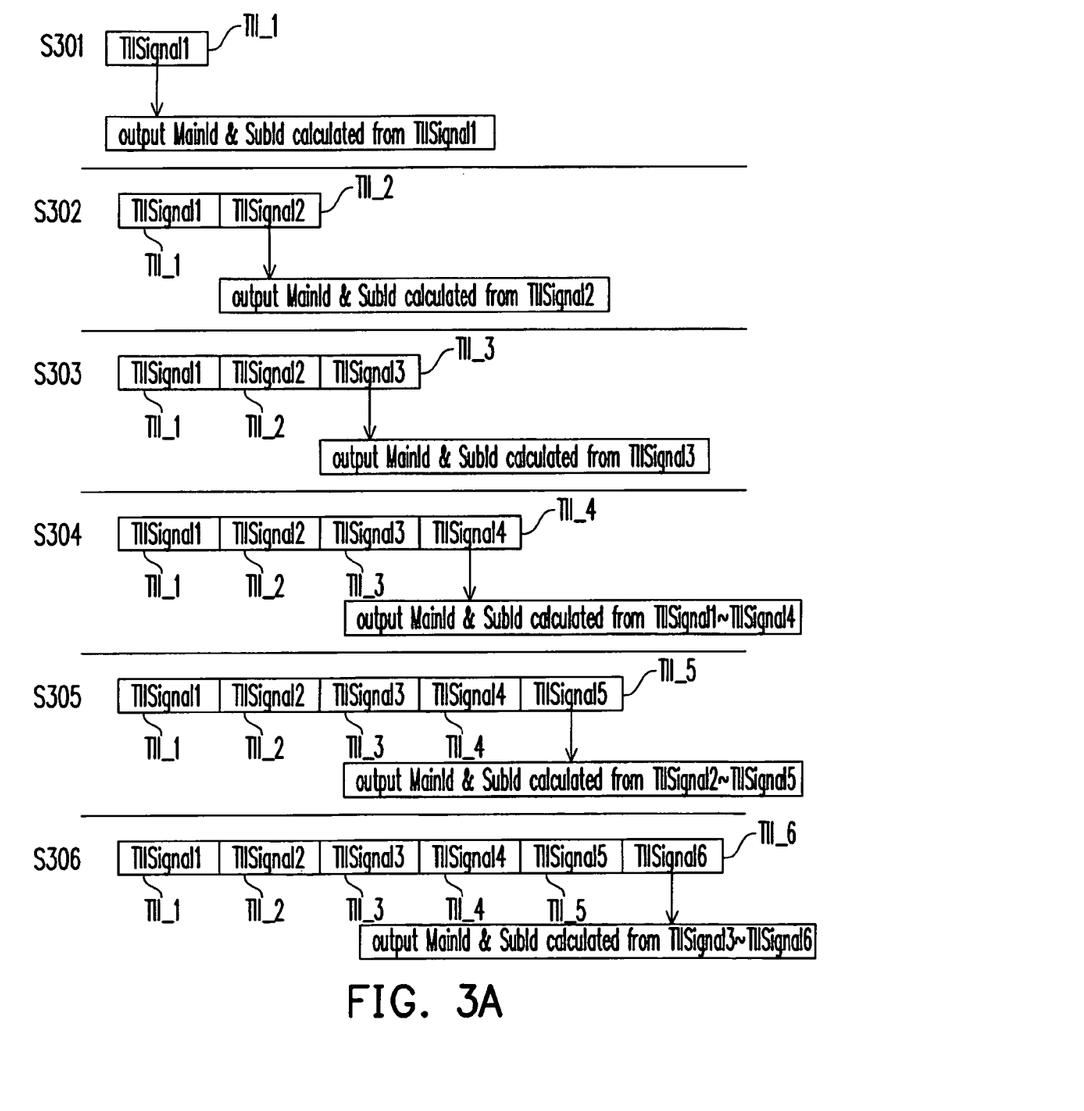
FIG. 3A is a flowchart of a method for obtaining a present MainId and a present SubId by using every AVE_TF_NUM pieces of TII signal.

Since the TII signal is present once in every two OFDM frames, thus in order to obtain the MainId and the SubId, operations of detecting TII signal on every two OFDM frames are sequentially conducted. For a higher accuracy of solving the MainId and the SubId in the embodiment, every AVE_TF_NUM pieces of TII signal are used to obtain the present MainId and the present SubId. FIG. 3A is a flowchart of a method for obtaining a present MainId and a present SubId by using every AVE_TF_NUM pieces of TII signal, and FIG. 3B is a flowchart of another method for obtaining a present MainId and a present SubId by using every AVE_TF_NUM pieces of TII signal, wherein FIGS. 3 and 4 are corresponding to AVE_TF_NUM=4.

As shown in FIG. 3A, in step S301, a MainId and a SubId are solved according to the received first TII signal TII_1. In step S302, a MainId and a SubId are solved according to the received second TII signal TII_2. In step S303, a MainId and a SubId are solved according to the received third TII signal TII_3. In step S304, a MainId and a SubId are solved according to the received first until fourth TII signals TII_1-TII_4. In step S305, a MainId and a SubId are solved according to the received second until fifth TII signals TII_2-TII_5. In step S306, a MainId and a SubId are solved according to the received third to sixth TII signal TII_3-TII_6.

Figure 3B:
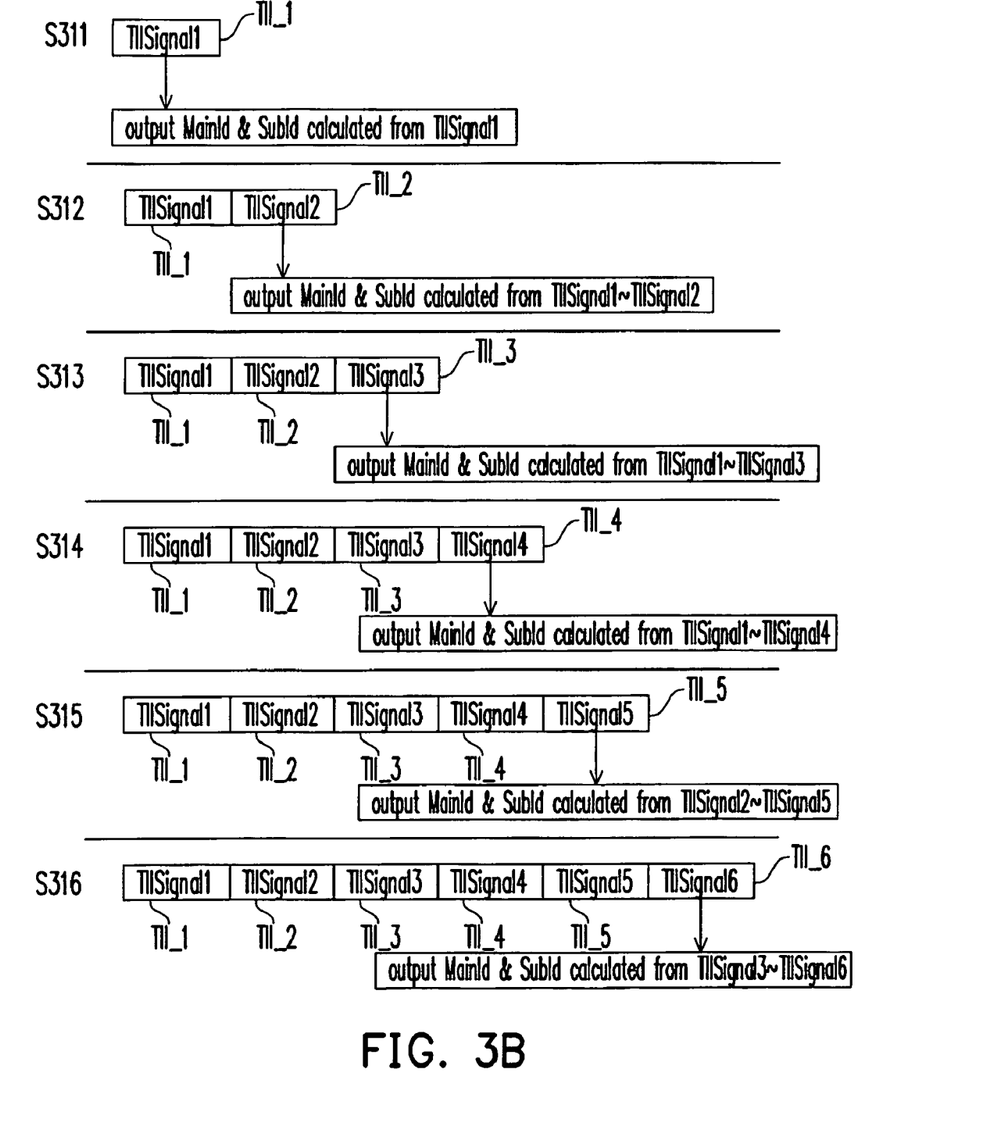
FIG. 3B is a flowchart of another method for obtaining a present MainId and a present SubId by using every AVE_TF_NUM pieces of TII signal.

Another embodiment is shown by FIG. 3B, in step S311, a MainId and a SubId are solved according to the received first TII signal TII_1. In step S312, a MainId and a SubId are solved according to the received first and second TII signals TII_1 and TII_2. In step S313, a MainId and a SubId are solved according to the received first until third TII signals TII_TII_3. In step S314, a MainId and a SubId are solved according to the received first until fourth TII signals TII_1-TII_4. In step S315, a MainId and a SubId are solved according to the received second until fifth TII signals TII_2-TII_5. In step S316, a MainId and a SubId are solved according to the received third to sixth TII signal TII_3-TII_6. The difference between FIG. 3A and FIG. 3B is that when the number of the received TII signals is less than four, the MainId and the SubId are solved according to the present TII signals or according to the present TII signals and simultaneously referring to the previous TII signals.

Figure 4A:
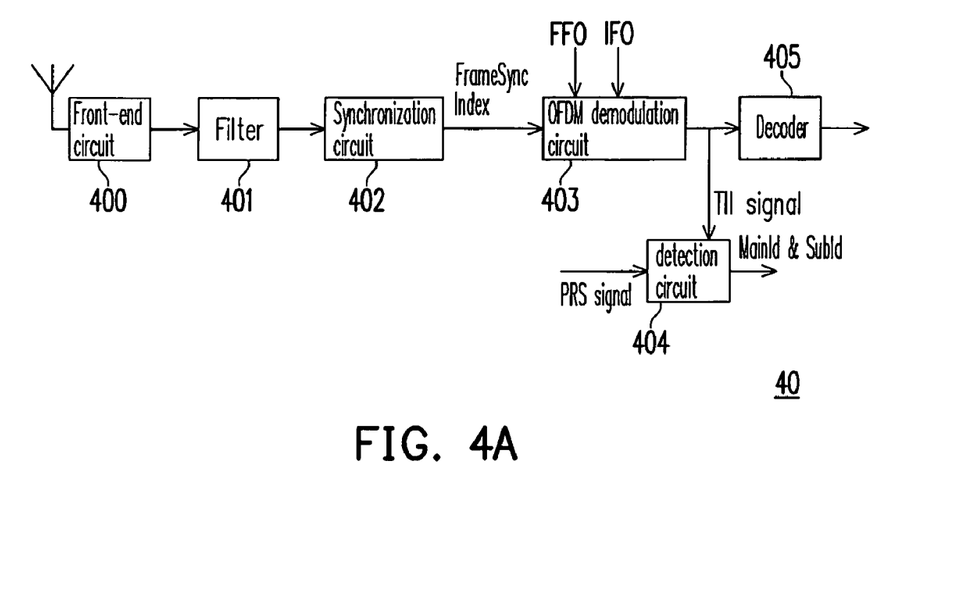
FIG. 4A is a system block diagram of a TII signal detection circuit applied to a DAB receiver according to one embodiment of the present invention.

FIG. 4A is a system block diagram of a TII signal detection circuit 404 applied to a DAB receiver 40 according to one embodiment of the present invention. Referring to FIG. 4A, a DAB receiver 40 includes a front-stage circuit 400, a filter 401, a synchronization circuit 402, an OFDM demodulating circuit 403, a TII signal detection circuit 404 and a decoder 405. The front-stage circuit 400 includes an antenna for receiving a DAB signal from a wireless channel and then converting the received DAB signal into a baseband signal to the filter 401. The filter 401 is employed for filtering the baseband signal and then sending the filtered baseband signal to the synchronization circuit 402. The synchronization circuit 402 is employed for conducting signal synchronization on the filtered baseband signal and outputting frame synchronization indices FrameSyncIndex and the baseband signal after synchronization to the OFDM demodulation circuit 403. The OFDM demodulation circuit 403 is for demodulating the synchronized baseband signal. In general, in order to make the demodulation result of the OFDM demodulating circuit 403 have no frequency offset, the OFDM demodulation circuit 403 would demodulate the synchronized baseband signal in consideration of the frame synchronization indices FrameSyncIndex, a integral frequency offset estimation (IFO estimation) and a fractional frequency offset estimation (FFO estimation). Further, the OFDM demodulation circuit 403 sends the demodulation result to the decoder 405 and the TII signals detection circuit 404. The TII signal detection circuit 404 then extracts the TII signals from the demodulation result and solves the MainId and the SubId according to the received TII signals and the PRS signals of the local terminal.

Figure 4B:
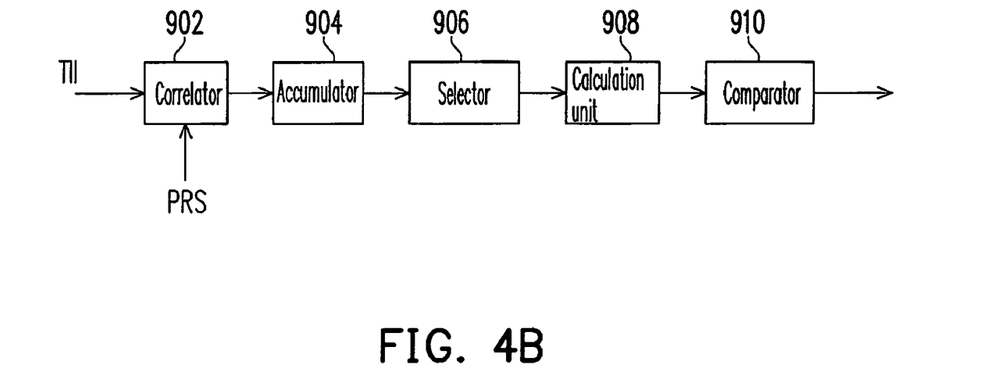
FIG. 4B is a system block diagram of the TII signal detection circuit according to one embodiment of the present invention.

FIG. 4B is a system block diagram of the TII signal detection circuit 404 according to one embodiment of the present invention. Referring to FIG. 4B, a TII signal detection circuit 404 includes a correlator 902, an accumulator 904, a selector 906, a calculation unit 908 and a comparator 910. The correlator 902 is for conducting a cross-correlation calculation on the TII signal and the PRS to obtain a present cross-correlation result. The cross-correlation calculation is conducted on the TII signal and the PRS every two adjacent sub-carriers. The accumulator 904 is employed for summing the present cross-correlation result and the previous cross-correlation results conducted on the last (m−1) TII signals and the last (m−1) PRSs to obtain an accumulated cross-correlation result, wherein m is the quantity of the TII signals required for obtaining the accumulated cross-correlation result. The selector 906 is employed for finding out a plurality of indices corresponding to a plurality of maximal values in the accumulated cross-correlation result. The calculation unit 908 is employed for calculating the present MainId and the present SubId according to the plurality of indices. The comparator 910 is employed for comparing the present MainId with the previous MainId obtained by the last operation and for comparing the present SubId with the previous SubId obtained by the last operation. When the present MainId is different from the previous MainId obtained by the last operation or the present SubId is different from the previous SubId obtained by the last operation, the comparator 910 checks if the MainId obtained by the next operation is equal to the present MainId and the SubId obtained by the next operation is equal to the present SubId. If the MainId obtained by the next operation is equal to the present MainId and the SubId obtained by the next operation is equal to the present SubId, the comparator 910 outputs the present MainId and the changed present SubId, otherwise, the comparator 910 outputs the previous MainId and the previous SubId.

Figure 5:
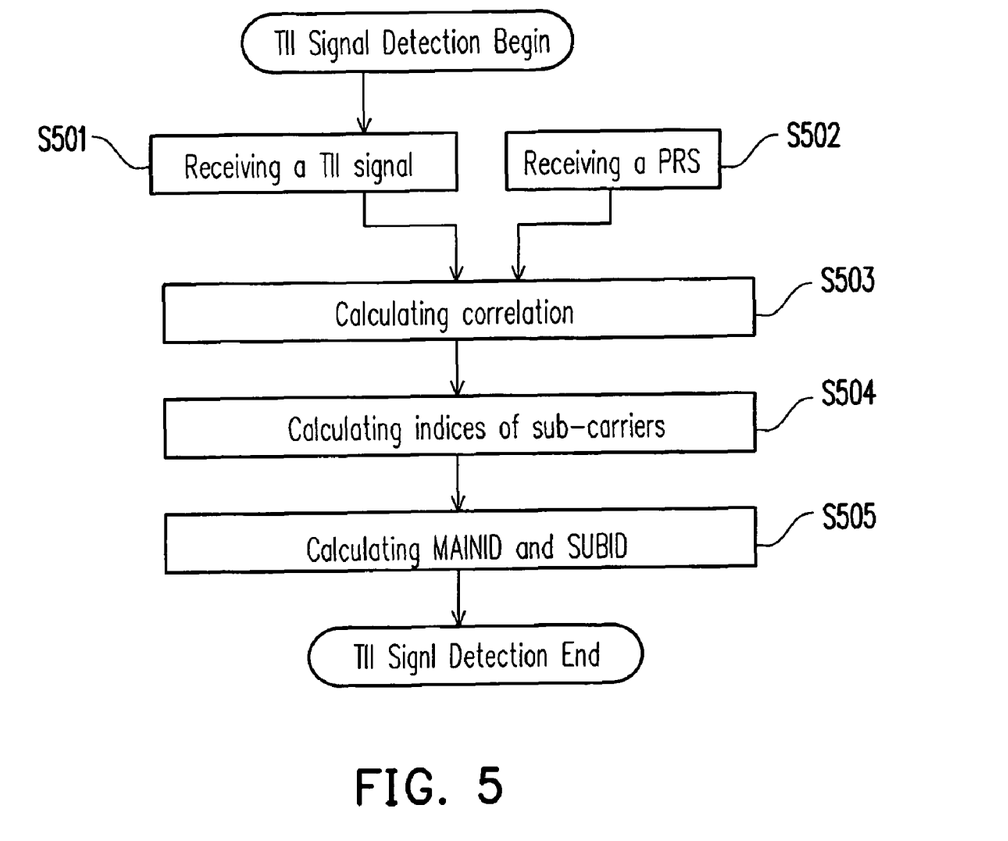
FIG. 5 is a flowchart showing an implementation method of detecting a TII signal by using the TII signal detection circuit according to one embodiment of the present invention.

The TII signal detection circuit 404 detects a TII signal as the described in the following. FIG. 5 is a flowchart showing an implementation method of detecting a TII signal by using the TII signal detection circuit 404. Referring to FIG. 5, in step S501, the TII signal detection circuit 404 receives a TII signal. In step S502, the TII signal detection circuit 404 receives a PRS signal from a local terminal. In step S503, the TII signal detection circuit 404 conducts a cross-correlation calculation on the TII signal and the PRS, wherein the TII signal detection circuit 404 would sum the presently calculated cross-correlation results and the last cross-correlation result obtained by conducting a cross-correlation calculation on the AVE_TF_NUM_1 pieces of TII signals and the PRSs so as to produce an accumulated cross-correlation result. If the quantity of the TII signals are less than AVE_TF_NUM_1, the detection method is the same as the method of FIG. 3A or FIG. 3B; namely, for the case with a quantity of TII signals less than AVE_TF_NUM_1, the TII signal detection circuit 404 can either sum the present cross-correlation result and all the previous cross-correlation results of the TII signal and the PRS as the accumulated cross-correlation result, or take the cross-correlation result of the present TII signal and the present PRS only as the accumulated cross-correlation result, wherein the cross-correlation calculation is conducted once on the TII signal and the PRS for every two sub-carriers, and the reason and the details can refer the statement described above, thus it is omitted herein for simplicity.

In step S504, the TII signal detection circuit 404 calculates the indices of the sub-carrier signals according to the accumulated cross-correlation result obtained by the present operation, where the indices with the maximal values of the accumulated correlation result are searched every n points. The indices with maximal values of the accumulated correlation result are obtained according to the length of the TII signal, and then, four indices with four maximal values are chosen among these indices. In the embodiment, n is 24 or 48; but the present invention does not limit the quantity. The reason for every 24 points or every 48 points to sample a point is reducing the required capacity of the register and saving calculation time. In step S504, the TII signal detection circuit 404 can directly search for four indices with four maximal values of the accumulated correlation result within the entire OFDM symbols.

Finally in step S505, the MainId and the SubId are obtained according to the indices of the sub-carriers. Usually, the MainId and the SubId are not changed too quickly, so that a comparison between the last obtained MainId and SubId and the presently obtained MainId and SubId is conducted. If the present MainId is not same as the previous MainId or the SubId is not same as the previous SubId, then check the present MainId is equal to the next obtained MainId and the present SubId is equal to the next obtained SubId. If the present MainId is equal to the next obtained MainId and the present SubId is equal to the next obtained SubId, output the present MainId and the present SubId, otherwise, output the previous MainId and the previous SubId.

In short, if the presently calculated MainId and SubId are different from the previous ones and are duplicated as the next calculated MainId and SubId, the outputs of the MainId and SubId would be changed. Note that the implementation described above does not limit the present invention, however, the implementation allows the TII signal detection circuit 404 to have better robustness against noise and interference. In particular, when an interference causing continuous faults occurs, the implementation is able to lower the probability of outputting the wrong MainId and SubId. Besides, the TII signal detection circuit 404 further functions to detect whether or not the obtained p of the MainId and the c of the SubId fall in the coding range of the DAB specification. If they are not in the coding range, the TII signal detection circuit 404 would conclude the obtained MainId and SubId are wrong so as to output the last obtained MainId and SubId. Certainly, the said implementation does not limit the present invention too, however it makes the TII signal detection circuit 404 have an additional function so as to lower the error probability of the MainId and SubId.

For the transmission modes I and IV, the calculation of cross-correlation result can be conducted on the result of a group or the result of each group. As described hereinbefore, the scheme by dividing the TII signal into groups to calculate the cross-correlation calculation on the TII signal and the PRS is advantageous in reducing the capacity of the register (or memory), and further obtaining better effect against noise and interference if summing the cross-correlation results of every group or choosing the cross-correlation result of the best group (for example, the cross-correlation result of the group with a highest signal intensity) as the cross-correlation result of the present TII signal.

In fact, for the transmission modes I and IV, all of 192 cross-correlation results of each group without noise and interference are the same, which suggests only the cross-correlation result of one group is taken for judging all the positions of the sub-carriers with signal values (i.e., the indices of the sub-carriers containing signal values). In contrast, the transmission modes II and III have no the said characteristic.

Figure 6:
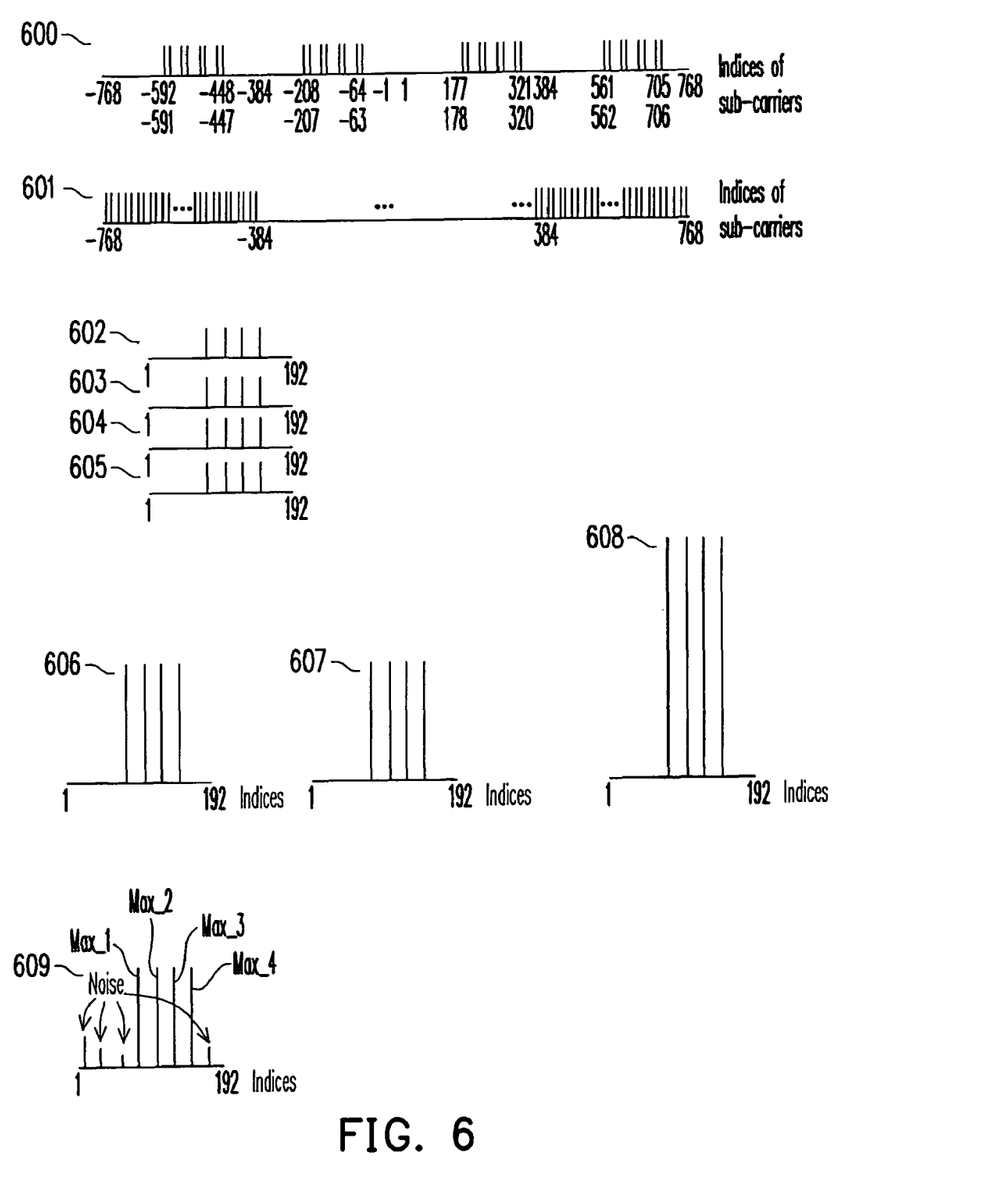
FIG. 6 is a signal wave diagram of detecting TII signal in transmission mode I according to the embodiment of FIG. 5.

FIG. 6 is a signal wave diagram of detecting TII signal in transmission mode I according to the embodiment of FIG. 5. Referring to FIG. 6, it is assumed the case of FIG. 6 is in transmission mode I, wherein c=16, p=14 and AVE_TF_NUM=2. A cross-correlation calculation is conducted on the received TII signal 600 and the PRS 601, wherein a groups division calculation on the TII signal 600 and the PRS 601 is conducted as above described to produce a cross-correlation result 602 of the first group, a cross-correlation result 603 of the second group, a cross-correlation result 604 of the third group and a cross-correlation result 605 of the fourth group. In the embodiment, the cross-correlation results 602-605 of the first until fourth groups are summed to obtain a cross-correlation result 606, followed by adding the cross-correlation result 606 of the present TII signal 600 and the cross-correlation result 607 of the last TII signal to obtain an accumulated cross-correlation result 608. However, the accumulated cross-correlation result 608 is corresponding to the ideal case without noise. In fact, noise makes a normal accumulated cross-correlation result take 609 instead of 608. After finding out the index with the first maximal value Max_1 in four maximal values according to the accumulated cross-correlation result 609, sampling is conducted every 24 points for finding out the rest three maximal values Max_2-Max_4. In the end, the coding values p and c of the MainId and the SubId are obtained according to the indices of the four maximal values Max_1-Max_4. Compared to the prior art, thanks to the plurality of the cross-correlation results 606 and 607, the present embodiment has better robustness against noise.

Figure 7:
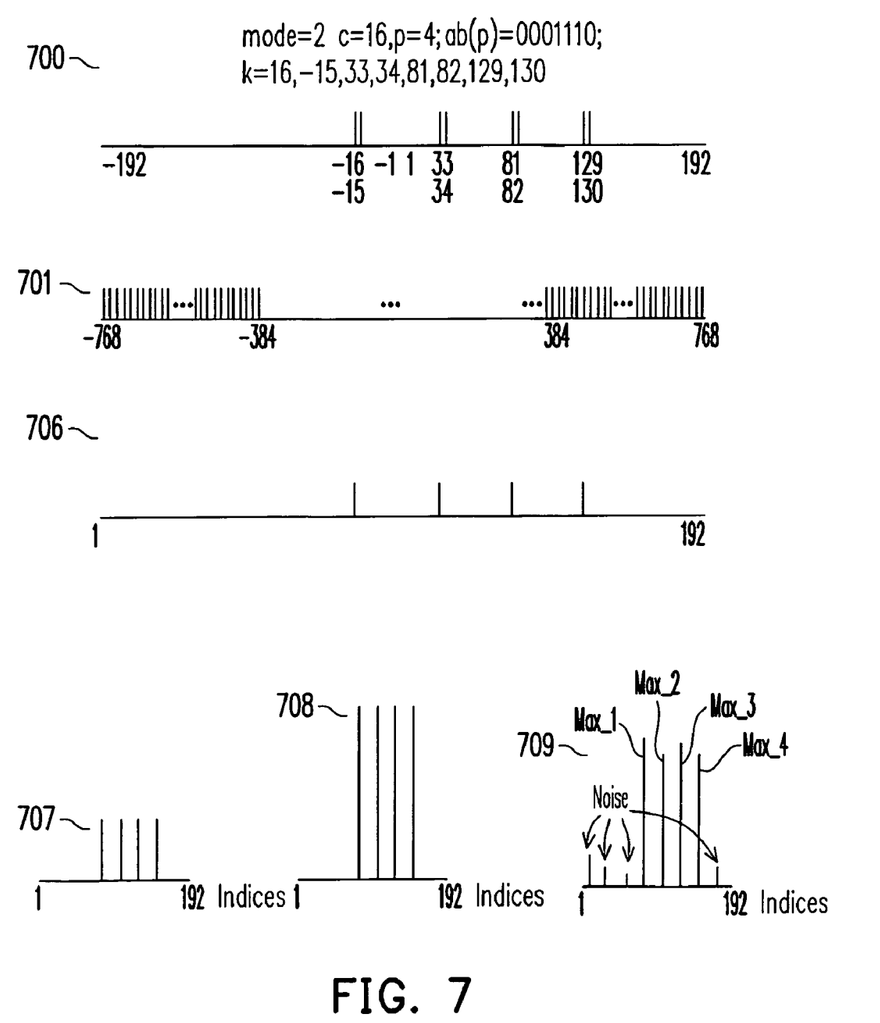
FIG. 7 is a signal wave diagram of detecting TII signal in transmission mode II according to the embodiment of FIG. 5.
Figure 8A:
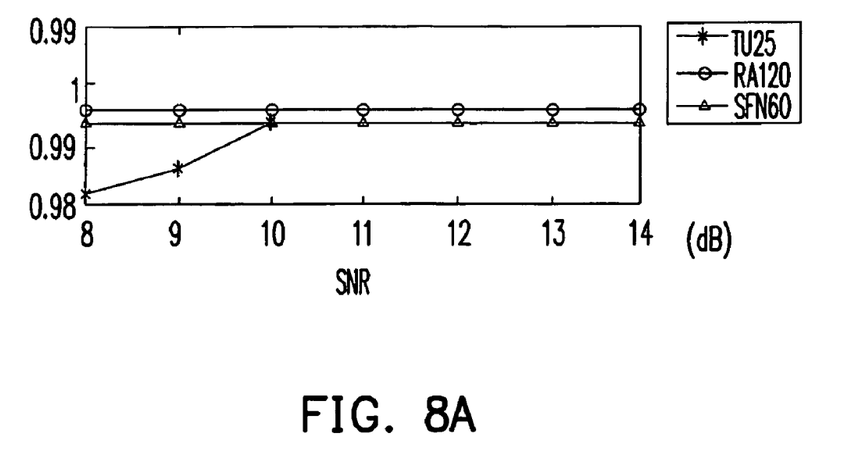
FIGS. 8A-8D are schematic graphs showing the probabilities of correctly decoding a TII signal in a decay channel by the TII signal detection circuit.
Figure 8B:
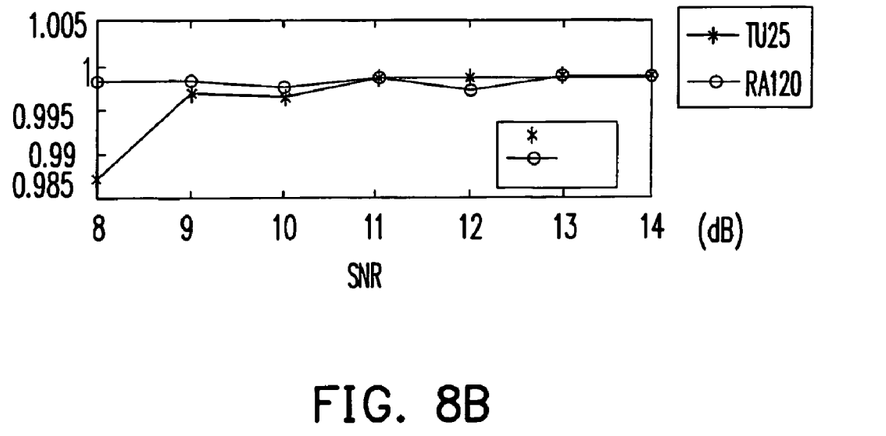
Figure 8C:
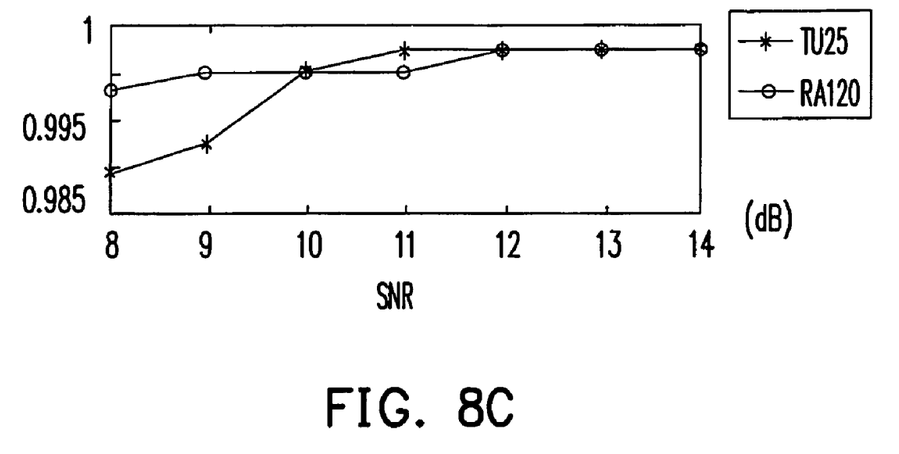
Figure 8D:
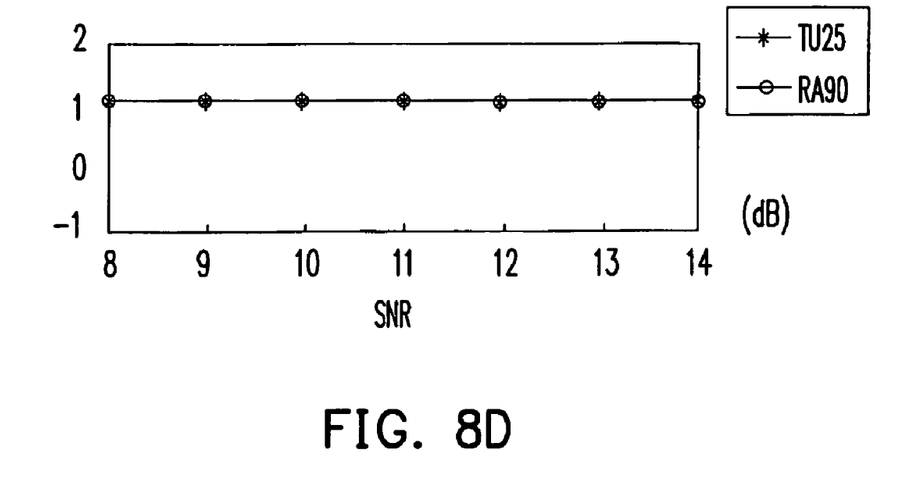

FIG. 7 is a signal wave diagram of detecting TII signal in transmission mode II according to the embodiment of FIG. 5. Referring to FIG. 7, it is assumed that the case of FIG. 6 is in transmission mode II, wherein c=16, p=14 and AVE_TF_NUM=2. A cross-correlation calculation is conducted on the received TII signal 700 and the PRS 701, wherein a calculation as the mentioned method is conducted on the TII signal 700 and the PRS 701 to produce a cross-correlation result 706. Then, the cross-correlation result 706 of the present TII signal 700 and the cross-correlation result 707 of the last TII signal are summed to obtain an accumulated cross-correlation result 708. However, the accumulated cross-correlation result 708 is corresponding to the ideal case without noise. In fact, noise makes a normal accumulated cross-correlation result take 709 instead of 708. After finding out the index with the first maximal value Max_1 in four maximal values according to the accumulated cross-correlation result 709, sampling is conducted once every 24 points for finding out the rest three maximal values Max_2-Max_4. In the end, the coding values p and c of the MainId and the SubId are obtained according to the indices of the four maximal values Max_1-Max_4.

In other embodiments, the four maximal indices can be directly searched out within the accumulated cross-correlation result 708, instead of conducting sampling on the accumulated cross-correlation result once every 24 points.

FIGS. 8A-8D are schematic graphs showing the probabilities of correctly decoding a TII signal in a decay channel by the TII signal detection circuit 404. Referring to FIGS. 8A-8D, it is assumed AVE_TF_NUM=4 in FIGS. 8A-8D, wherein TU25, RA90, RA120 and SFN60 represent different decay channel types, which are defined in the standards of British Standard BS EN 50248:2001 and Characteristics of DAB receivers. It can be seen from FIGS. 8A-8D, when a signal-noise-ratio (SNR) ranges 8-12 dB, the probability of correctly decoding the TII signal is close to 100%.

In summary, the circuit and the method of detecting TII signal provided by the embodiments of the present invention are able to reduce the capacity of the memory or the register and make a probability of correctly decoding the TII signal close to 100%. Compared to the prior art, the present invention is advantageous in implementation simplicity, less calculation time and high robustness against noise and interference.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for transmitter identification information signal detection, suitable for an orthogonal frequency division modulation (OFDM) system and receiving a transmitter identification information signal, comprising:
  a correlator for conducting a cross-correlation calculation on the transmitter identification information signal and a phase reference symbol to obtain a present cross-correlation result, wherein the correlator conducts a cross-correlation calculation on the transmitter identification information signal and the phase reference symbol of every two adjacent sub-carriers;

an accumulator for summing the present cross-correlation result and last (m−1) cross-correlation results obtained by respectively conducting cross-correlation calculations on the previous corresponding transmitter identification information signals and the phase reference symbols so as to obtain an accumulated cross-correlation result, wherein m is the number of the transmitter identification information signals required for obtaining the accumulated cross-correlation result;

a selector for finding out a plurality of indices corresponding to a plurality of maximal values in the accumulated cross-correlation result; and a calculation unit for calculating a present main identifier and a present sub-identifier of the transmitter identification information signal according to the plurality of indices.

2. The apparatus according to claim 1, further comprising a comparator, wherein in response to the present main identifier is different from a previous main identifier obtained last time, or the present sub-identifier is different from a previous sub-identifier, the comparator checks if a following main identifier obtained next time is equal to the present main identifier and a following sub-identifier obtained next time is equal to the present sub-identifier, wherein in response to the following main identifier obtained next time is equal to the present main identifier and the following sub-identifier obtained next time is equal to the present sub-identifier, the comparator outputs the present main identifier and the present sub-identifier, otherwise, the comparator outputs the previous main identifier and the previous sub-identifier.

3. The apparatus according to claim 2, wherein in response to the coding value range of the present main identifier or the coding value range of the present sub-identifier is not in the range specified in the specification of orthogonal frequency division modulation system, the comparator outputs the previous main identifier and the previous sub-identifier.

4. The apparatus according to claim 1, wherein the selector is for finding out the maximal indices corresponding to the plurality of maximal values in the accumulated cross-correlation result among every n indices.

5. The apparatus according to claim 1, wherein the apparatus divides the transmitter identification information signal and the phase reference symbol into a plurality of transmitter identification information signal groups and a plurality of phase reference symbol groups, and conducts calculations of cross-correlation on the transmitter identification information signal groups and the corresponding phase reference symbol groups so as to obtain a plurality of dividing groups of cross-correlation results.

6. The apparatus according to claim 5, wherein the present cross-correlation result is obtained with one of the following modules or a combination thereof:

the first module which sums the dividing groups of cross-correlation results and takes the summation result as the present cross-correlation result; and the second module which takes the dividing group of cross-correlation results with the highest signal intensities among the dividing groups of cross-correlation results as the present cross-correlation result.

7. The apparatus according to claim 1, wherein the quantity of the previous cross-correlation results is less than (m−1), the accumulated cross-correlation result is obtained with one of the following modules or a combination thereof:

the third module which takes the present cross-correlation result as the accumulated cross-correlation result; and the fourth module which sums the present cross-correlation result and all the previous cross-correlation results and takes the summation result as the accumulated cross-correlation result.

8. A receiver for orthogonal frequency division modulation system, capable of detecting a transmitter identification information signal; the receiver comprising:

an orthogonal frequency division modulation demodulator;

a decoder, coupled to the orthogonal frequency division modulation demodulator; and a transmitter identification information signal detection apparatus, wherein the transmitter identification information signal detection apparatus receives a transmitter identification information signal and further comprises:

a correlator for conducting a cross-correlation calculation on the transmitter identification information signal and a phase reference symbol to obtain a present cross-correlation result, wherein the correlator conducts a cross-correlation calculation on the transmitter identification information signal and the phase reference symbol of every two adjacent sub-carriers;

an accumulator for summing the present cross-correlation result and last (m−1) cross-correlation results obtained by respectively conducting cross-correlation calculations on the previous corresponding transmitter identification information signals and the phase reference symbol, wherein m is the number of the transmitter identification information signals required for obtaining the accumulated cross-correlation result;

a selector for finding out a plurality of indices corresponding to a plurality of maximal values in the accumulated cross-correlation result; and a calculation unit for calculating a present main identifier and a present sub-identifier of the transmitter identification information signal according to the plurality of indices.

9. A method for transmitter identification information signal detection, suitable for an orthogonal frequency division modulation system (OFDM system), comprising:

conducting a cross-correlation calculation on a received transmitter identification information signal and a phase reference symbol to obtain a present cross-correlation result, wherein the cross-correlation calculation is conducts once on the transmitter identification information signal and the phase reference symbol of every two adjacent sub-carriers;

summing the present cross-correlation result and last (m−1) cross-correlation results obtained by respectively conducting cross-correlation calculations on the previous corresponding transmitter identification information signals and the phase reference symbol so as to obtain an accumulated cross-correlation result, wherein m is the number of the transmitter identification information signals required for obtaining the accumulated cross-correlation result;

finding out a plurality of indices corresponding to a plurality of maximal values in the accumulated cross-correlation result; and calculating a present main identifier and a present sub-identifier of the transmitter identification information signal according to the plurality of indices.

10. The method according to claim 9, further comprising:

comparing the present main identifier with a previous main identifier obtained last time or comparing the present sub-identifier with a previous sub-identifier obtained last time wherein if the present main identifier is not equal to the previous main identifier obtained last time or the present sub-identifier is not equal to the previous sub-identifier obtained last time, then comparing a following main identifier obtained next time with the present main identifier and comparing a following sub-identifier obtained next time with the present sub-identifier, and wherein if the following main identifier obtained next time is equal to the present main identifier and the following sub-identifier obtained next time equal to the present sub-identifier, then outputting the present main identifier and the present sub-identifier, otherwise outputting the previous main identifier and the previous sub-identifier.

11. The method according to claim 9, further comprising:
finding out the maximal indices corresponding to the plurality of maximal values in the accumulated cross-correlation result among every n indices according to the accumulated cross-correlation result.

12. The method according to claim 9, further comprising:
when the coding value range of the present main identifier or the coding value range of the present sub-identifier is not in the range specified in the specification of orthogonal frequency division modulation system, outputting the previous main identifier and the previous sub-identifier.

13. The method according to claim 9, further comprising:
dividing the transmitter identification information signal and the phase reference symbol into a plurality of transmitter identification information signal groups and a plurality of phase reference symbol groups, and conducting calculations of cross-correlation on the transmitter identification information signal groups and the corresponding phase reference symbol groups so as to obtain a plurality of dividing groups of cross-correlation results.

14. The method according to claim 13, wherein the present cross-correlation result is obtained with one of the following steps or a combination thereof:

summing the dividing groups of cross-correlation results and taking the summation result as the present cross-correlation result; and taking the dividing group of cross-correlation results with the highest signal intensities among the dividing groups of cross-correlation results as the present cross-correlation result.

15. The method according to claim 9, wherein if the quantity of the previous cross-correlation results is less than (m−1), the present cross-correlation result is obtained with one of the following steps or a combination thereof:

taking the present cross-correlation result as the accumulated cross-correlation result; and summing the present cross-correlation result and all the previous cross-correlation results as the accumulated cross-correlation result.

* * * * *